(12) United States Patent
Lee et al.

(10) Patent No.: US 7,876,947 B2
(45) Date of Patent: Jan. 25, 2011

(54) SYSTEM AND METHOD FOR DETECTING TAGGED MATERIAL USING ALPHA MATTING

(75) Inventors: Tin Man Lee, Los Angeles, CA (US); Sarang Lakare, Chester Springs, PA (US); Matthias Wolf, Coatesville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 315 days.

(21) Appl. No.: 12/244,428

(22) Filed: Oct. 2, 2008

(65) Prior Publication Data

US 2009/0097728 A1  Apr. 16, 2009

Related U.S. Application Data

(60) Provisional application No. 60/978,896, filed on Oct. 10, 2007.

(51) Int. Cl.
*G06K 9/00* (2006.01)
*A61B 6/00* (2006.01)

(52) U.S. Cl. ............................. 382/131; 378/4; 378/21

(58) Field of Classification Search ................ 382/128, 382/129, 130, 131, 132, 133, 134, 171, 173, 382/190; 378/4, 8, 21–27, 98.4, 98.6, 101, 378/901; 600/407, 410, 411, 425; 128/915, 128/920, 922
See application file for complete search history.

(56) References Cited

FOREIGN PATENT DOCUMENTS

WO  2007/064980 A  6/2007

OTHER PUBLICATIONS

Chuang, "Bayesian Image Matting", New Models and Methods for Matting and Compositing (Ph.D. Thesis), 2004, pp. 15-34.
Tu et al., "A Learning Based Approach for 3D Segmentation and Colon Detagging", Computer Vision—ECCV 2006 Lecture Notes in Computer Science, Springer, Berlin, DE, vol. 3953, Jan. 1, 2006, pp. 436-448.
International Search Report including Notification of Transmittal of the International Search Report, International Search Report, and Written Opinion of the International Searching Authority.
Yung-Yu Chuang, et al., "A Byesian Approach to Digital Matting," vol. 2. (Dec. 2004) 264-271.
Yung-Yu change, et al., "Video Matting of Complex Scenes," ACM Transaction on Graphics 21 (3) (2002) 243-248.

*Primary Examiner*—Abolfazl Tabatabai

(57) ABSTRACT

A method for computer-aided object classification, soft segmentation and layer extraction in computed tomographic colonography includes providing a contrast enhanced computed tomography (CT) digital image of the colon, finding a foreground region of voxels with an intensity higher than a pre-defined foreground threshold, creating a 3D trimap of the colon where the image is segmented into the foreground region, a background region, and an unknown region between the foreground and background, starting from the background, extracting successive layers of the unknown region until the foreground region is reached, and classifying each extracted layer as background or foreground, and generating a foreground matte, a background matte, and an alpha matte, where alpha indicates a mixing ration of foreground and background voxels.

23 Claims, 7 Drawing Sheets

SYSTEM AND METHOD FOR DETECTING TAGGED MATERIAL USING ALPHA MATTING

CROSS REFERENCE TO RELATED UNITED STATES APPLICATIONS

This application claims priority from "Alpha Matting Technique for the Detection of Tagged Material", U.S. Provisional Application No. 60/978,896 of Lee, et al., filed Oct. 10, 2007, the contents of which are herein incorporated by reference in their entirety.

TECHNICAL FIELD

This disclosure is directed to object classification in computed tomographic colonography.

DISCUSSION OF THE RELATED ART

Colorectal cancer is the second leading cause of cancer-related death in the western world. Early detection of precancerous polyps through colorectal screening can largely prevent colon cancer by enabling removal of the polyps before they turn malignant. However, traditional optical colonoscopy is highly uncomfortable which hinders the popularity of routine colorectal screening. Virtual colonoscopy, on the other hand, uses minimally invasive computer tomography (CT) scanning which reduces the cost and risk and still yields a high diagnostic performance to detect clinically significant polyps as compared to traditional colonoscopy. However, since residual materials inside the colon have the same intensity as the colonic wall in a CT scan, they could be falsely interpreted as a part of the colon which can hinder the detection of polyps. Some polyps may remain undetected and some residual material may be misinterpreted as polyps. Therefore, proper bowel preparation known as colon cleansing is carried out. This usually includes cleansing the colon with large amount of fluid or administering laxatives to induce bowel movements. The process is uncomfortable and is a major bottleneck to the adoption of CT colon screening. Several groups of researchers have developed different fluid-based diets for bowel preparation. After the diet, the colon of the patient contains mostly residual fluid. With the ingestion of contrast agents, the intensity of the residual fluid will be enhanced. By detecting and removing these high intensity residuals from the image, the colon image is cleared from residuals and polyp detection can then be carried out. However, patients still need to undergo several days of a fluidic diet which is still uncomfortable. Because of this, the colon contains not only residual fluids but also solid residuals attached along the colonic wall and folds. These solid residuals hinder the detection of polyps and can result in false positives. However, due to the limited resolution and contrast of CT and the varying absorption rate of the contrast agents, the enhanced residual fluids do not have clear boundaries due to partial voluming, which hinders the segmentation and removal of these residuals. The boundary between air and residuals has a varying thickness and the intensity of the boundary is the same as soft tissue. In addition, the soft tissue near the boundary between residuals and tissue is enhanced and is much higher than the typical intensity of soft tissue.

To remove these solid tagged materials, there are several challenges:

1. Partial voluming and pseudo-enhancement effects due to the high intensity of tagged materials.

2. The intensity of tagged materials can range from 1300HU up to 4000HU, with different effects on partial volume and pseudo-enhancement due to different intensities.

3. Due to different absorption rates of the contrast agents, the intensity of tagged material drops along the colon, with different intensities in different locations of the colon.

4. Solid and liquid tagged materials can form a thin layer along the colonic wall. The severe partial voluming can hinder their removal.

Because of the high intensity of tagged materials, they can create an aura around themselves that causes an intensity glow on the neighborhood elements, which is called pseudo-enhancement. Traditional methods of using thresholding to remove tags from air and tissue will fail in this case. The thickness and intensity of the aura varies greatly, from 0 to 5 voxels, due to inhomogeneous absorption of the contrast agent by the tagged material. The intensity of the tagged material can range from 1100HU to 5000HU. Extracting and removing unwanted objects or occlusion from 2D image and 3D scenes has been an important subject in computer vision, and is especially important in medical imaging, where occlusions may hinder the detection of important objects valuable for disease detection in 3D tomography data. To accurately extract an object from a 3D dataset, one should to take into account the "intensity blending" across object boundaries to recover the pure intensity of the corresponding object and background in the ambiguous blended regions.

To understand the challenges involved in the removal of colon solid tagged materials, referred to herein below as tags, consider the simplest and traditional thresholding method and see how it fails.

FIG. 1 illustrates the effects of performing thresholding on an image. If one sets a high threshold, a hole 11 will be formed in the tag, with a thin line remaining. If one sets a low threshold, some tissue voxels will be removed.

Current research on image segmentation in the presence of occlusions has not addressed the issue of opacity in the presence of partial volumes. However, it is the blending ratio of the partial volume that is of interest, not the recovery of the occluded part, one doe not need to inpaint the lost region using level lines or intensity information.

By finding the opacity in the presence of pixel color blending, matting is a powerful tool for natural foreground extraction. Matting typically requires a user to specify a trimap which indicates a definite foreground where $\alpha$ equals 1, a definite background where $\alpha$ equals 0, and an unknown region where $\alpha$ is to be determined. Information from known background and foreground is utilized to estimate the $\alpha$ in the unknown region. Matting can obtain a soft segmentation based on the $\alpha$ values. It is particularly useful when images have severe partial volumes and limited resolution. However, currently there are no matting algorithms being applied to medical tomographic images, partly due to the fact that matting was originally designed for extracting a foreground such as a human face to "matte" it to another background. But in fact, matting and trimap creation provide powerful insights for handling partial voluming and pseudo-enhancement tasks in 3D colon cleansing.

Tissue classification is also an active area of research in MRI and CT. Current methods focus on multiple tissue types which do not have clear geometric relationship, such as in the colon where soft tissue, air and tag locations can be easily modeled.

Most of the previous works on colon cleansing has focused on tagged liquid materials after the liquid diet. Because the tagged materials are liquid, they show a horizontal line parallel to the bed where the patient is lying on. Above the liquid level the voxels are definitely belonged to air. The most challenging task is to locate that boundary of liquid and air to remove the liquid.

SUMMARY OF THE INVENTION

Exemplary embodiments of the invention as described herein generally include methods and systems for fully-automatic 3D computer-aided object classification, soft segmentation and layer extraction in the newest computed tomographic digital colon fecal-tagging protocol for early detection of colorectal cancer, by unifying and generalizing the techniques in alpha matting, morphological operations and feature aggregation. A method according to an embodiment of the invention obtains an alpha value which indicates the blending of foreground and background, and accurately classifies the background to resolve partial voluming and pseudo-enhancement effects, and extracts and removes residual solid materials for patients who do not undergo any bowel preparation diet. A method according to an embodiment of the invention includes a new method called alphamat detagging, which extends matting to 3D tomographic images, fully automatic trimap generation in medical imaging through anatomical and geometric priors without user input, automatic classification of tissue types in the presence of partial volume and pseudo-enhancement which hinders the automated detection of polyps in fecal-tagging colon computed tomography. A confidence measure is introduced which assigns a probability to each voxel of the dataset including the regions where foreground objects are fractionally blended with the background objects. Experimental results are presented which show that a method according to an embodiment of the invention can extract ambiguous boundaries such as foreground objects with shapes of "thin cloth" or "small balls" where classical methods are not applicable. The results indicate that laxatives and a prescreening fluid diet may no longer be needed for colon cancer CT screening. An algorithm according to an embodiment of the invention can also automatically detect T-junctions on-the-fly.

According to an aspect of the invention, there is provided a method for computer-aided object classification, soft segmentation and layer extraction in computed tomographic colonography, including providing a contrast enhanced computed tomography (CT) digital image of the colon, the image comprising a plurality of intensities associated with a 3-dimensional (3D) grid of voxels, finding a foreground region of voxels with an intensity higher than a pre-defined foreground threshold, creating a 3D trimap of the colon where the image is segmented into the foreground region, a background region, and an unknown region between the foreground and background, starting from the background, extracting successive layers of the unknown region until the foreground region is reached, and classifying each extracted layer as background or foreground, and generating a foreground matte, a background matte, and an alpha matte, where alpha indicates a mixing ration of foreground and background voxels.

According to a further aspect of the invention, the background region voxels represent either regions of air in the colon, or regions of known soft tissue in the colon.

According to a further aspect of the invention, creating a 3D trimap of the colon comprises morphologically dilating the 3D foreground region one voxel at a time until background region voxels are reached, where a region through which the foreground was diluted is a region of unknown type, and categorizing the background region voxels as either air or soft tissue.

According to a further aspect of the invention, classifying each extracted layer as background or foreground comprises forming a 3D sphere around a candidate layer voxel and neighboring known background voxels, and analyzing closest known background voxels to determine whether the candidate layer voxel is a background air voxel or a background soft tissue voxel.

According to a further aspect of the invention, the method includes calculating the mixing ratio alpha for each voxel in the unknown region from alpha=(C−B)/(F−B), where C is the intensity of the voxel, B is a background intensity, and F is a foreground intensity.

According to a further aspect of the invention, analyzing closest known background voxels comprises finding values of f and B that maximize a sum of log-likelihoods L(C|B, F, α)+L(F)+L(B)+L(α), where $$L(C \mid F, B, \alpha) = -\frac{\|C - \alpha F - (1-\alpha)B\|^2}{2\sigma_C^2},$$

$$L(F) = -\frac{\|F - \overline{F}\|^2}{2\sigma_F^2},$$

$$\text{and } L(B) = -\frac{\|B - \overline{B}\|^2}{2\sigma_B^2},$$

where $\sigma_C^r$, $\sigma_F^2$, $\sigma_B^2$ are respective standard deviations for C, F, and B.

According to a further aspect of the invention, generating a foreground matte, a background matte, and an alpha matte, comprises forming a 3D sphere around each candidate voxel in the region of unknown type, obtaining from the background region within the sphere a number of air voxels, a number of tissue voxels, their respective distance from the candidate voxel, and their variance, obtaining from the foreground region within the sphere a number of tagged voxels having an intensity above a threshold for contrast enhancement, their respective distance from the candidate, and their variance, weighting the intensity of each tissue voxel by its distance from the candidate voxel, weighting the intensity of each air voxel by its distance from the candidate voxel, weighting the intensity of each foreground voxel by its distance from the candidate voxel, and calculating alpha from $C = \alpha F + \int_{\Omega(air)} H_{air}(1-\alpha(i))B_{air}(i) + \int_{\Omega(tissue)} H_{tissue}(1-\alpha(i))B_{tissue}(i)$, where C is the intensity of the candidate voxel, $B_{air}$ is a background air intensity, $B_{tissue}$ is a background tissue intensity, F is a foreground intensity, $\Omega$ is a region of integration in either air voxels or tissue voxels, i represents a voxel in the region of integration, and H is the Heaviside function having a value of 1 inside the region of integration.

According to a further aspect of the invention, a foreground weighting function is $$F_{candidate} = \exp(-\beta_1 \sum d_i) \exp(-\beta_2/N) \frac{\sum F_i/d_i}{\sum 1/d_i},$$

where $F_{candidate}$ is the foreground weighted intensity at the candidate voxel, $F_i$ is the intensity value of the image at voxel i within the 3D sphere, $d_i$ is the distance to the candidate voxel, $\beta_1$ and $\beta_2$ are pre-defined parameters, a background weighting function is $$B_{candidate} = \exp(-\beta_1 \sum d_i) \exp(-\beta_2/N) \frac{\sum B_i/d_i}{\sum 1/d_i},$$

where $B_{candidate}$ is the background weighted intensity at the voxel location and $B_i$ indicates the intensity value of the known background within the 3D sphere.

According to a further aspect of the invention, a candidate voxel is identified as a T-junction where the number of tissue voxels, air voxels, and a number of tagged voxels are greater than zero inside a sphere of a predetermined small radius.

According to a further aspect of the invention, for tagged voxels laying on a haustral fold, the method includes dilating the tagged voxels by a number of voxels less than an original size of the morphological dilation, removing the tagged voxels and dilated voxels from a voxel window whose side is greater than the original size of the morphological dilation, performing region growing to find connected voxels, identifying the connected voxels, and performing matting, where there is no type change of any voxel that has been identified as a connected voxel.

According to another aspect of the invention, there is provided a program storage device readable by a computer, tangibly embodying a program of instructions executable by the computer to perform the method steps for computer-aided object classification, soft segmentation and layer extraction in computed tomographic colonography.

DETAILED DESCRIPTION OF EXEMPLARY EMBODIMENTS

Figure 1:
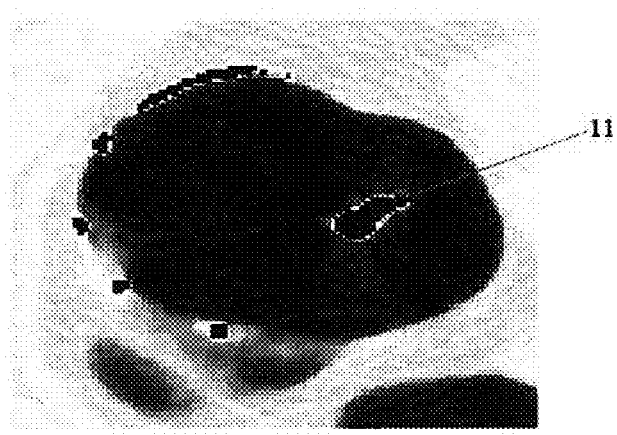
FIG. 1 illustrates how thresholding can create holes in an object, according to an embodiment of the invention.

Exemplary embodiments of the invention as described herein generally include systems and methods for detecting tagged material using alpha matting in computed tomographic colonography. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography magnetic resonance imaging, ultrasound, or any other medical imaging system known to one of skill in the art. The image may also be provided from non-medical contexts, such as, for example remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Overview

Matting has successfully evolved in computer graphics with results that are well-validated by natural images, high dynamic image ground truth, and synthetic images. Alpha matting is used to estimate the ambiguous blended region at the boundary of object and background. Since colon solid tag can have any size and shape, and be located anywhere along the colonic wall and folds, machine learning, hierarchical or multiscale methods are not suitable here. Also, since the tag has varying intensity, size and shape, and can light up nearby voxels, hard segmentation with a definite boundary is not a good approach.

Instead, an alpha channel is used which captures the idea that the intensity value in an image voxel can be a result of mixing of intensities from multiple objects, resulting in a need for soft segmentation. The color blending is due to limited resolution of CT. In this framework, one looks not only at the neighborhood intensity, but in each cluster of neighborhoods, one looks at a rich set of features including distance, number of neighborhood voxels, their gradients, variance, etc. A 3D sphere is created to handle partial voluming based on the rich set of features of the neighborhood voxels. Since the background information is propagated layer by layer from the region which is definitely not contaminated with pseudo-enhancement, the task of pseudo-enhancement is addressed at the same time.

Figure 2:
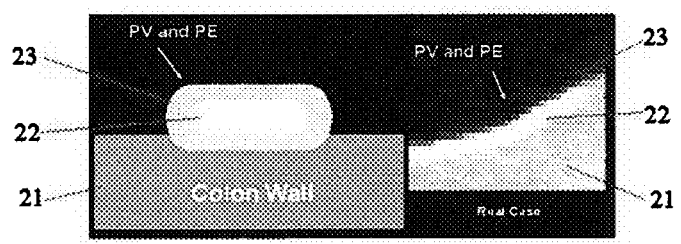
FIG. 2 illustrates partial volume and pseudo enhancement effects, according to an embodiment of the invention.

No seed point is needed to start the segmentation because region growing is not needed as initial information in colon. No learning is needed to analyze the interface between tagged material/air, air/tissue, tissue/tagged material as everything can be determined by known background propagation. Unknown regions are defined by two criteria. First, soft tissue will be mistakenly detected at the mixed area of tagged material and air. Secondly, intensity of real soft tissue will be increased at the interface of tissue and tagged material. A confidence level is assigned to each voxel at the mixed boundary to indicate the contribution of foreground intensity and background intensity to give rise to the intensity of the mixed voxel. The task is inherently underconstrained because for each observation C, one needs to find its corresponding foreground F, background B, and ratio. In computer graphics with color images having complicated backgrounds and foregrounds, this task is ill-posed. However, a set of prior information can be used. For example, one knows that tagged material is always inside air, on the colonic wall or folds. FIG. 2 illustrates partial volume (PV) and pseudo-enhancement (PE) effects in an image. On the left is a simulated model showing a colon wall 21, tag 22, and PV and PE 23. On the right is real data with colon wall 21, tag 22, and PV and PE 23. The grey area 23 around the white tag is the aura, which creates the partial voluming and pseudo-enhancing.

A method according to an embodiment of the invention can assign probabilities to indicate the blending ratio of solid residual materials and colonic wall, where partial voluming and pseudo enhancement are severe, and provide a confidence map of residual materials to the existing colon CT software to further improve the accuracy of polyp detection. A method according to an embodiment of the invention is a first application of alpha matting to colon cancer detection, and first application of assigning a confidence probability to a foreground to address the solid tag issue for a protocol where patients do not need to undergo fluid diet prior to a scan.

Tomographic Matting Model

A composition equation according to an embodiment of the invention is:

$$C = \alpha F + (1-\alpha)B, \quad (1)$$

where C, F, and B are a voxel's composite, foreground and background intensity, respectively, and $\alpha$ is a fractional opacity with a value between 0 and 1 which is the mixing ratio of the foreground intensity and background intensity. The basic idea is to estimate intensity F, and B, and the ratio $\alpha$ from the observed intensity C.

There is one grayscale image matting equation (EQ. (1)) and three unknowns. Given the intensity of C, a Bayesian matting method finds the most likely values of F, B, and $\alpha$ by maximizing over a sum of log-likelihoods:

$$\underset{F,B,\alpha}{\operatorname{argmax}} P(F, B, \alpha \mid C) = \underset{F,B,\alpha}{\operatorname{argmax}} \frac{P(C \mid F, B, \alpha) P(F) P(B) P(\alpha)}{P(C)}$$

$$= \underset{F,B,\alpha}{\operatorname{argmax}} \begin{pmatrix} L(C \mid B, F, \alpha) + \\ L(F) + L(B) + L(\alpha) \end{pmatrix}$$

where L( ) is the log-likelihood of P( ). The first term introduces a standard deviation $\sigma_C$ and is used to model the Gaussian noise in the image:

$$L(C \mid F, B, \alpha) = -\frac{\|C - \alpha F - (1-\alpha)B\|^2}{2\sigma_C^2}. \quad (2)$$

By capturing the foreground voxels within a circular radius, the voxels are partitioned into several clusters, that is, into connected single regions. For each cluster, which is a combination of colors in color matting, a weighted mean color $\overline{F}$ and weighted covariance matrix $\Sigma_F$ are calculated. The weight of a voxel is related to $\alpha_i^2$, which gives the color of a more opaque voxel higher confidence. In a colon CT, a more opaque voxel has a higher chance of being tagged material. A spatial Gaussian $g_i$ can be used to stress the contribution of nearby pixels over more distant voxels. An exemplary, non-limiting value of $\sigma$ is 8 voxels. The combined weight is $w_i = \alpha_i^2 g_i$:

$$\overline{F} = \frac{1}{W} \sum_{i \in N} w_i F_i, \quad (3)$$

$$\Sigma_F = \frac{1}{W} \sum_{i \in N} (F_i - \overline{F})(F_i - \overline{F})^T, \quad (4)$$

There is a detailed discussion of the weighted distance function below. The log likelihoods for the foreground L(F) can be modeled as:

$$L(F) = -\frac{1}{2}(F - \overline{F})^T \Sigma_F^{-1} (F - \overline{F}), \quad (5)$$

where $\Sigma_F^{-1}$ is the inverse covariance matrix. For grayscale image, it becomes:

$$L(F) = \frac{\|F - \overline{F}\|^2}{2\sigma_F^2}. \quad (6)$$

The same applies to estimating background:

$$L(B) = -\frac{\|B - \overline{B}\|^2}{2\sigma_B^2}. \quad (7)$$

Figure 3:
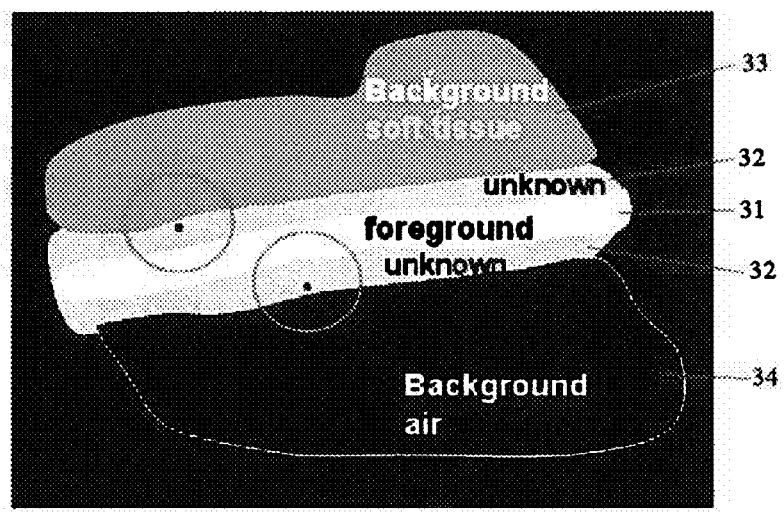
FIG. 3 illustrates tomographic matting with a trimap, according to an embodiment of the invention.

FIG. 3 illustrates tomographic matting with a trimap, illustrating the geometric properties of foreground 31, background soft tissue 33 and background air 34, and unknown tissue 32 in a colon CT. This allows breaking the different intensity distributions of the clusters into 3 types, thus allowing fast computations. By exploiting these geometric properties, there is no need to compare and choose the closest clusters as candidates for foreground and background because one geometrically forces a single cluster for background and foreground respectively. Without the computationally intensive comparison of different candidates, and without the need to project colors because of the grayscale image, one can directly obtain $\alpha$ based on weighted mean of foreground and weighted mean of background:

$$C = \alpha F + (1-\alpha)B,$$

$$= \alpha(i)F(i) + \int_{\Omega(air)} H_{air/tag}(1-\alpha(i))B_{air}(i) +$$

$$\int_{\Omega(tissue)} H_{tissue/tag}(1-\alpha(i))B_{tissue}(i).$$

where $\Omega$ indicates the region with the respective blended background, and H is the Heaviside function, which is 1 in the region indicated and 0 elsewhere.

Two challenging aspects in previous matting methods are creating trimaps through user interaction, and clustering the foreground and background into oriented Gaussians with weighted mean and covariance matrices and selecting the contributions that maximize the equation.

Figure 4:
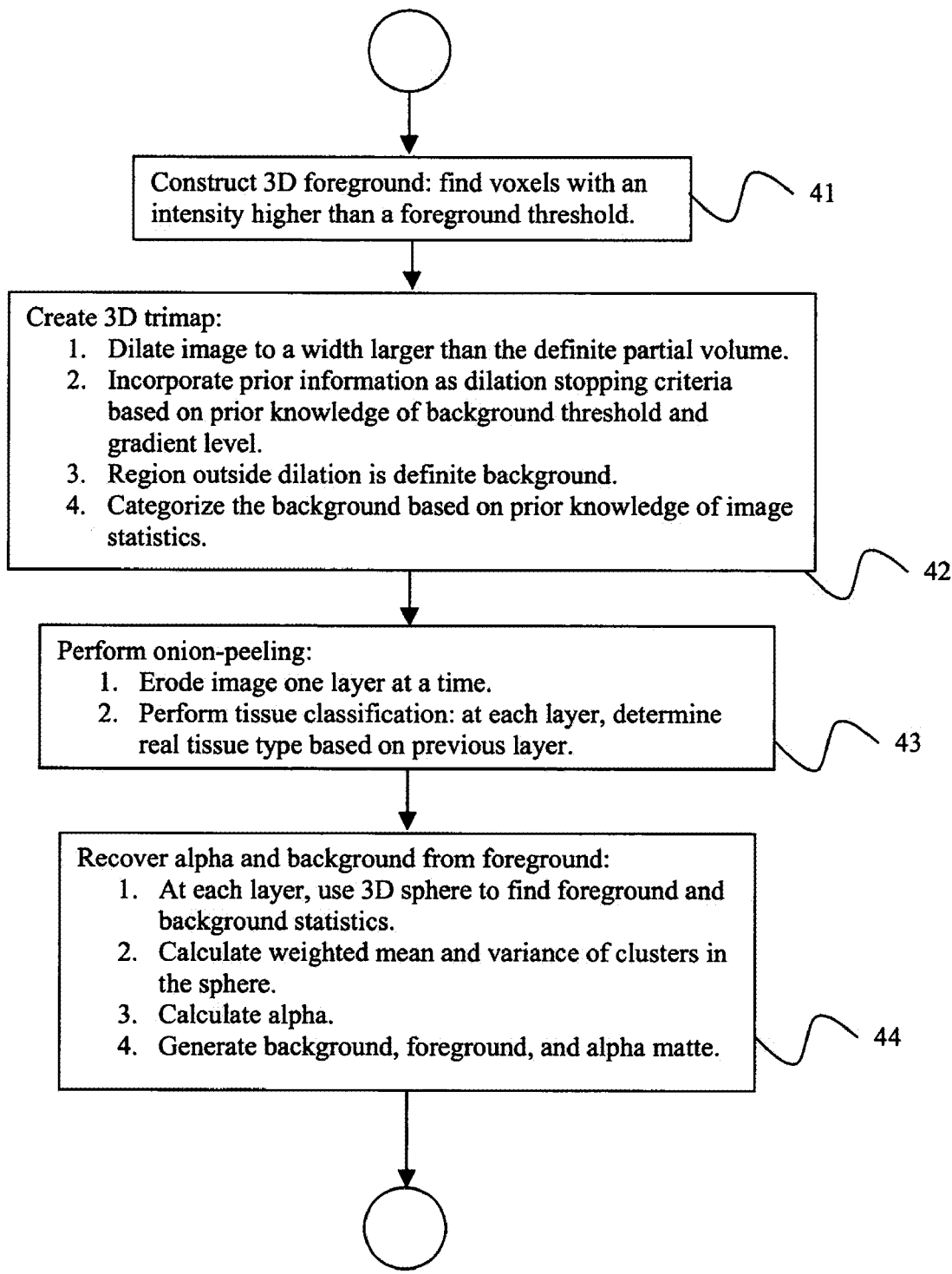
FIG. 4. is a flowchart of a tomographic matting method for colon detagging, according to an embodiment of the invention.

FIG. 4 shows a flowchart of an algorithm according to an embodiment of the invention. An algorithm begins at step 41, when a 3D foreground is created by finding voxels with an intensity higher than a predefined threshold for tagged material. An exemplary, non-limiting threshold value is 1300HU. Then, at step 42, a 3D trimap is created. First, a morphological dilation of a the 3D foreground region from step 41 is performed to identify the unknown region, based on the geometric properties of colon that the unknown region is always the "aura"/partial volume surrounding the foreground. An exemplary, non-limiting dilation window is 7×7×7, with support in the middle, and a thickness of the unknown material is from 0 to 4 voxels. The foreground region is dilated one voxel at a time to a width larger than the definite partial volume region. Prior information of the intensity values of tissue and/or air is used along with the gradient values to stop the dilation. So, if air or tissue voxels are encountered, then the dilation is stopped in that direction. The region outside the dilated region is definite background. After the foreground and unknown matte are formed, one can further identify the known, background region into definite-tissue or definite-air by using prior knowledge of the air threshold and the soft tissue threshold. After these steps, an accurate 3D trimap is formed that segments the colon into a foreground, a background, and an unknown region. At step 43, onion-peeling is performed by eroding the image one layer at a time, propagating from the background side of the unknown region to the foreground side. At each layer, the real tissue type is determined based on the previous layer using a Bayesian matting model according to an embodiment of the invention described above, which eliminates partial volume and pseudo-enhancement effects. The alpha and background are recovered from the foreground at step 44. At each layer, a 3D sphere of a predefined radius is used to calculate foreground and background statistics, and the weighted means and variances of clusters in the sphere are calculated. Then, alpha can be calculated and the background, foreground, and alpha matte can be generated.

By extending the Bayesian matting to 3D, a method according to an embodiment of the invention can determine foreground color F, background color B, and opacity given the observed intensity C for each voxel within the unknown region of the 3D dataset. A method according to an embodiment of the invention can automatically create trimaps without user-input, and uses an "onion peel" continuously sliding window to de-fine neighborhoods, propagating inward from the background regions but not from the known foreground, due to the ambiguity of tissue type near the foreground, which can only be solved from known information propagated from background. An algorithm according to an embodiment of the invention utilizes nearby computed B, F and α through their Gaussian distributions.

Automatic 3D Trimap Segmentation

Trimap determination in videos requires manual construction per frame, which is time consuming, and estimation of trimaps is sometimes inaccurate. But in medical tomographic images, there is a rich knowledge of anatomy priors which can be applied to obtain an accurate trimap. Most layer extraction algorithms generate binary masks for classifying pixels as foreground and background with a hard segmentation, instead of using opacity/alpha values to indicate the blending of colors and partial volumes.

Based on the prior information of CT, where the fecal-tagged materials have intensity higher than 1300HU, one can in an embodiment of the invention set the threshold for foreground as 1300HU. Any voxel above 1300HU is classified as definite Foreground:

$$F(i, j, k) = \begin{cases} 1 & \text{if } I(i, j, k) > \text{threshold,} \\ 0 & \text{otherwise.} \end{cases} \quad (8)$$

where I is the 3D CT image dataset, and F is the 3D definite foreground mask. Note that this value is exemplary and non-limiting, and other values are within the scope of other embodiments of the invention.

Since there is prior information that F has higher intensity than B and F also has higher intensity than C, one can write $$\alpha = \frac{C - B}{F - B},$$

where B is either $B_{air}$ or $B_{tissue}$ depending on the background propagation. Because of the incorporation of medical priors, the task reduces to a case where there is no need to search the best cluster for background. An onion peel method according to an embodiment of the invention ensures that the background tissue type is always chosen based on the nearest neighborhood of known background. The foreground thresholding can be extended to more general case where other prior information about the objective foreground is known.

Adaptive Morphological Dilation

Due to the fact that partial volume and pseudo-enhancement around the tagged materials do not have constant thickness, one may need to compute redundant voxels that are unaffected by the tagged materials if one always dilates by a constant number of voxels. However, when performing morphological dilation, one can incorporate CT priors and geometric priors to adaptively dilate to the unknown region which does not possess information regarding its background type. When dilating to a voxel that has intensity lower than the air-threshold, the dilation is stopped and that voxel is labeled as definite background and classified as air. When dilating to a voxel that has near constant gradients in its x, y and z directions and its intensity is in the soft tissue range, its true tissue is probability not affected by tagged materials.

Marching Inwards from Known Background

A method according to an embodiment of the invention marches from the known background. The unknown region closest to the foreground in colon CT is ambiguous and it is challenging to determine a candidate type from that region. Instead of a sliding 2D window, a 3D sphere with a predefined radius is used as a window to gather neighborhood information.

Figure 5:
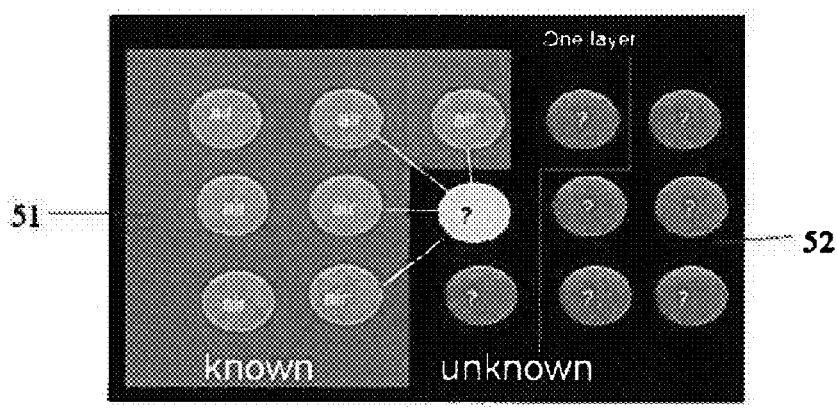
FIG. 5 illustrates an 'onion peeling' that marches inwards from a known background, according to an embodiment of the invention.
Figure 6:
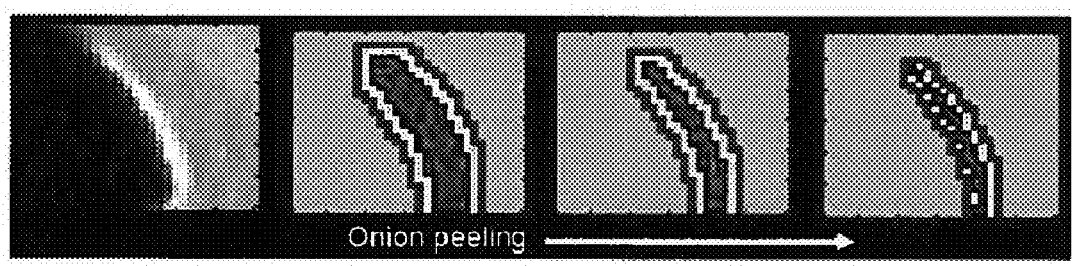
FIG. 6 depicts a 2D example of onion peeling, according to an embodiment of the invention.

FIG. 5 illustrates an onion peeling mechanism according to an embodiment of the invention, where layers are extracted by marching inward from a known background 51 to unknown tissue 52. A new candidate layer is investigated by a 3 by 3 by 3 kernel image erosion. At each candidate voxel, the closest known background voxel is analyzed to determine the type of candidate voxel, either tissue or air. FIG. 6 illustrates a 2D example of marching inwards from a known background, proceeding from the left image to the right image.

3D Feature Aggregation and Scale Selection by Radius of Sphere

A method according to an embodiment of the invention uses a 3D sphere to capture the neighborhoods of a candidate unknown voxel. 3D information is more important than a slice by slice treatment because the underlying structures may be misleading in 2D but may be obvious in 3D. An exemplary, non-limiting radius for colon cleansing is 4 voxels. The size of the radius indicates how much neighborhood information is desired. For a noisier dataset, a larger radius is useful to cancel noise. In a complicated structure where tissue, air and tagged materials are present, a larger radius can analyze the best tissue classification, obtaining a coarser scale analysis. What can be obtained from the 3D sphere neighborhood is a set of features, flexible for different purposes. In the colon cleansing case, one can obtain from the definite background region within the sphere radius the number of air voxels, the number of tissue voxels, their respective distance from the candidate voxel, and their variance, which can be used for noise reduction. From the definite foreground region within the sphere radius, one can obtain the number of tagged voxels above the tag threshold, their respective distance from the candidate, and the variance of the tagged voxels. Other statistical and geometric measures can be obtained, based on different applications.

Figure 7:
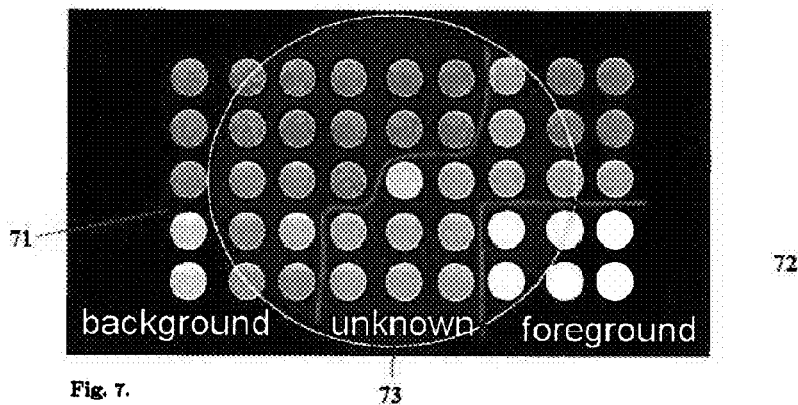
FIG. 7 illustrates how a 3D sphere captures information from background and foreground relative to a candidate location, according to an embodiment of the invention.

FIG. 7 illustrates how a 3D sphere (drawn as 2D in the figure) captures information from background and foreground relative to the candidate location. This figure shows how the sphere neighborhood can join background 71, foreground 72, and unknown regions 73.

Classification and T-junction

A 3D sphere approach according to an embodiment of the invention can also obtain the location of a Tjunctions on the fly, while counting the number of background and foreground type voxels. When the number of tissue voxels, air voxels and tagged material voxels are greater than zero but have a small radius, that candidate point is a T-junction location.

Matting and Alpha Value

After the candidate type of each layer of an "onion peel" is determined, the 3D sphere neighborhood of each candidate is analyzed. If the candidate type is tissue, the weighted intensity of tissue from the 3D sphere neighborhood of definite background is calculated from the intensity of each tissue voxel in the background neighborhood weighted by its distance from the candidate. The weight doubles as the distance doubles. The same applies to the case when candidate type is air. The alpha value $\alpha$ determines how likely that a voxel belongs to tagged material and how likely it is background. By tuning the segmentation based on thresholding a particular value of alpha, there is a potential that the true background boundary can be recovered.

Weighted Distance Function

According to an embodiment of the invention, there is a weighted distance measure which is proportional to the number of same-type background voxels in the 3D sphere, and their relative distance to the candidate. A user can fine tune the weight. A linear blending relationship of foreground and background is assumed. The intensity drop-off of foreground elements with respect to distance from the candidate voxel should be related to the number of foreground voxels in the 3D sphere, their relative distances to the candidate, and their distance-weighted mean intensity. A foreground weighting function according to an embodiment of the invention is:

$$F_{candidate} = \exp(-\beta_1 \sum d_i)\exp(-\beta_2/N)\frac{\sum F_i/d_i}{\sum 1/d_i}, \quad (9)$$

where $F_{candidate}$ indicates the foreground weighted intensity at the candidate location, and $F_i$ indicates the intensity value of the image at location i within the 3D sphere. $\beta_1$ and $\beta_2$ are parameters that can be set by a user. Similarly, the background weighting function is:

$$B_{candidate} = \exp(-\beta_1 \sum d_i)\exp(-\beta_2/N)\frac{\sum B_i/d_i}{\sum 1/d_i}, \quad (10)$$

where $B_{candidate}$ indicates the background weighted intensity at the candidate location and $B_i$ indicates the intensity value of the known background within the 3D sphere which is propagated by onion peeling.

In one exemplary, non-limiting embodiment of the invention, $\beta_1$ and $\beta_2$ were set to 0 for simplicity. The results will be more accurate if these two parameters are fine-tuned.

More sophisticated information can be added to this relationship if there is more information regarding the foreground and background such as a true profile between tagged material and soft tissue.

Soft Tissue, Air, and Partial Volumes

Assume a colon without tagged material. Inside the colon lumen, which is composed of soft tissue, there should only be air. Since it is desired to remove the foreground and classify the restored background into either air or tissue, the resulting background will include only air and tissue and the partial volumes at the boundaries originally containing tagged materials will be gone. This may look unnatural, but for the identification of true tissue from fake tissue to aid the polyp detection, visualization and cosmetic effects can be ignored. These boundaries can be smoothed or the partial volume effect can be recalculated based on the feature information aggregated by the 3D sphere in those boundary candidate voxels.

Thresholded Foreground

Since the foreground region, which has an intensity higher than the threshold, always has $\alpha$ equal to 1, this region will be considered to be pure air after the foreground is removed. However, in 3D tomography, the thresholded region sometimes covers tissue. If these regions are removed, they could be replaced by tissue. However, it is not necessary to do so, as one is more interested in the probability of tags in the unknown re-ion to avoid false positives in polyp detection.

Multiple Nearby Foreground Regions

If several foreground regions are nearby, the dilation process may combine and close several unknown regions. The onion peeling may not reach some regions that are closed. For example, if two tags are 10 voxels apart, then a 5 voxel dilation will completely close the gaps. In this situation, an onion peeling according to an embodiment of the invention is still performed. If the tissue type is determined but the known backgrounds are out of reach of the predefined radius of the 3D sphere, the radius can be increased until it obtains some neighborhood information.

Tagged Materials on Haustral Folds

Figure 8:
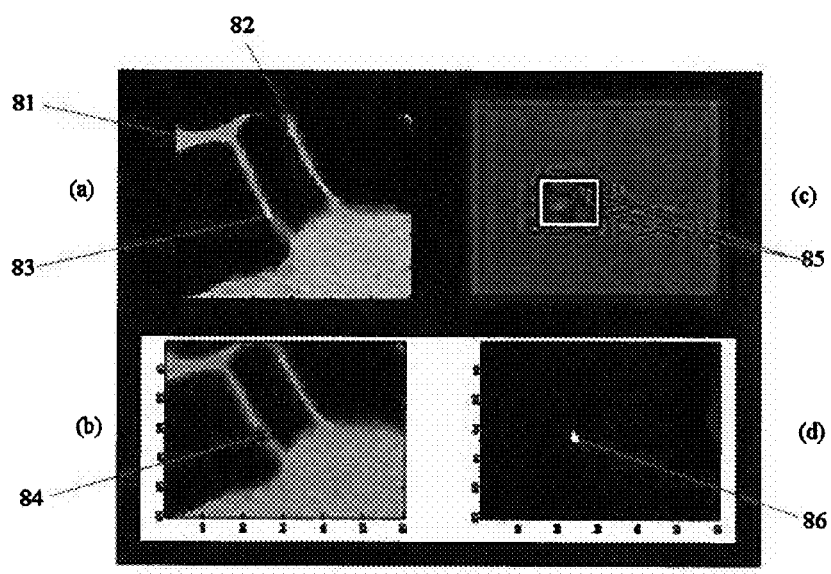
FIGS. 8(a)-(d) illustrate a tag on a fold, according to an embodiment of the invention.

One challenge in tag removal concerns tagged material laying on a haustral fold. Since folds can appear as narrow as 4 mm in a CT slice, a fold can have the same thickness and appearance as a partial volume between tagged materials and air. Since a matting algorithm according to an embodiment of the invention uses known neighborhood information, the known neighborhood information of a haustral fold, which is mostly air, is not helpful in distinguishing partial volume from true tissue. A matting algorithm will break the fold while removing the tag. However, according to an embodiment of the invention, instead of dilating the thresholded tag by the current number voxels, dilate it by a reduced number of voxels, then subtract the thresholded tag and the dilated part from a voxel window whose side is greater than the original dilation size. For example, instead of dilating the thresholded tag by 5 voxels, dilate it by 2 voxels, then subtract the thresholded tag and the dilated part from a 10×10×10 voxel windows. Since one only dilates 2 voxels, the two sides of the fold after the subtraction should still have a thin region connected with each other. Region growing can find the connected component, an identifier is assigned to these connected voxels and matting is performed again, with an added condition that there is no change to the type of any voxel that has been identified as connected tissue. In this way, one can avoid having true connected tissue being replaced by known air background. FIGS. 8(a)-(d) shows the result of a tag on fold situation. The folds are the 2 linear structures 81, 82 going from top-left to bottom-right in both the left side images, FIGS. 8(a)-(b). The bright region 83 in the FIG. 8(a) on one of the folds is tagged material. This material is removed after applying an algorithm according to an embodiment of the invention to obtain FIG. 8(b). The hole 84 remaining on the tag can compliment the alpha foreground mat that was retrieved when polyp detection is performed. FIG. 8(c) shows a zoomed in view that the fold 85 is still connected. The fold is not broken because of air surrounding the fold matting inwards. FIG. 8(d) shows the material 86 that was removed from the FIG. 8(a) resulting in FIG. 8(b).

Small Tagged Materials with Intensity Lower than Threshold

Some tagged materials with size less than 3 mm×3 mm×3 mm have intensity lower than the foreground threshold. Their intensities are even lower than the true tissue intensity in some regions. Although these tagged materials usually do not effect detection of polyps bigger than 5 mm, a method according to another embodiment of the invention can search for these small tagged materials by creating sliding windows of 5 voxels×5 voxels×5 voxels along the boundary between colon lumen and the colonic wall. If a voxel is a local maxima in that window, it can be treated as a small tagged material.

Speed

Since the task was confined to matting an unknown region, the region is just a narrow-band around the tagged material with a thickness of about 5 voxels. This allows for fast computation by looking at a much smaller number of voxels than the whole 3D dataset.

Results

Thin Cloth

Figure 9:
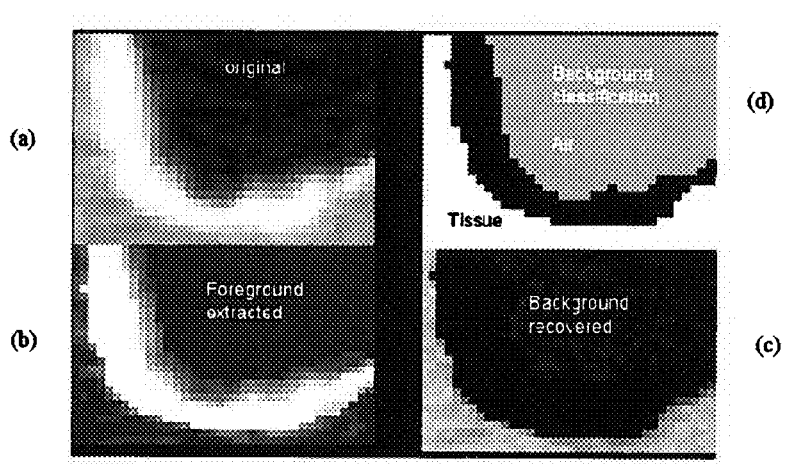
FIGS. 9(a)-(d) show the results of classification and tag removal from a thin cloth shape, according to an embodiment of the invention.

An algorithm according to an embodiment of the invention can identify "fake" tissue which, due to partial voluming, has the same intensity as the true soft-tissue, while retaining the real soft tissue near the tagged materials which might be misinterpreted as "fake" tissues. This is a classification task and the unknown region is treated as a location where the voxels might be a mixing of either air with tagged materials or tissue with tagged materials. FIGS. 9(a)-(d) shows the results of classification, foreground extraction, and background recovery. FIG. 9(a) is the original image, FIG. 9(b) shows the image with the foreground extracted, FIG. 9(c) shows the image with the background recovered, and FIG. 9(d) shows the image with the background classified into tissue and air. The classification accurately classifies the background into true tissue and true air. The extracted foreground shows the probabilistic map which indicates the blending fraction of foreground and background. The background recovered looks natural. A simple Gaussian blurring can make the recovered boundary resemble the colon wall.

3D Matting

Figure 10:
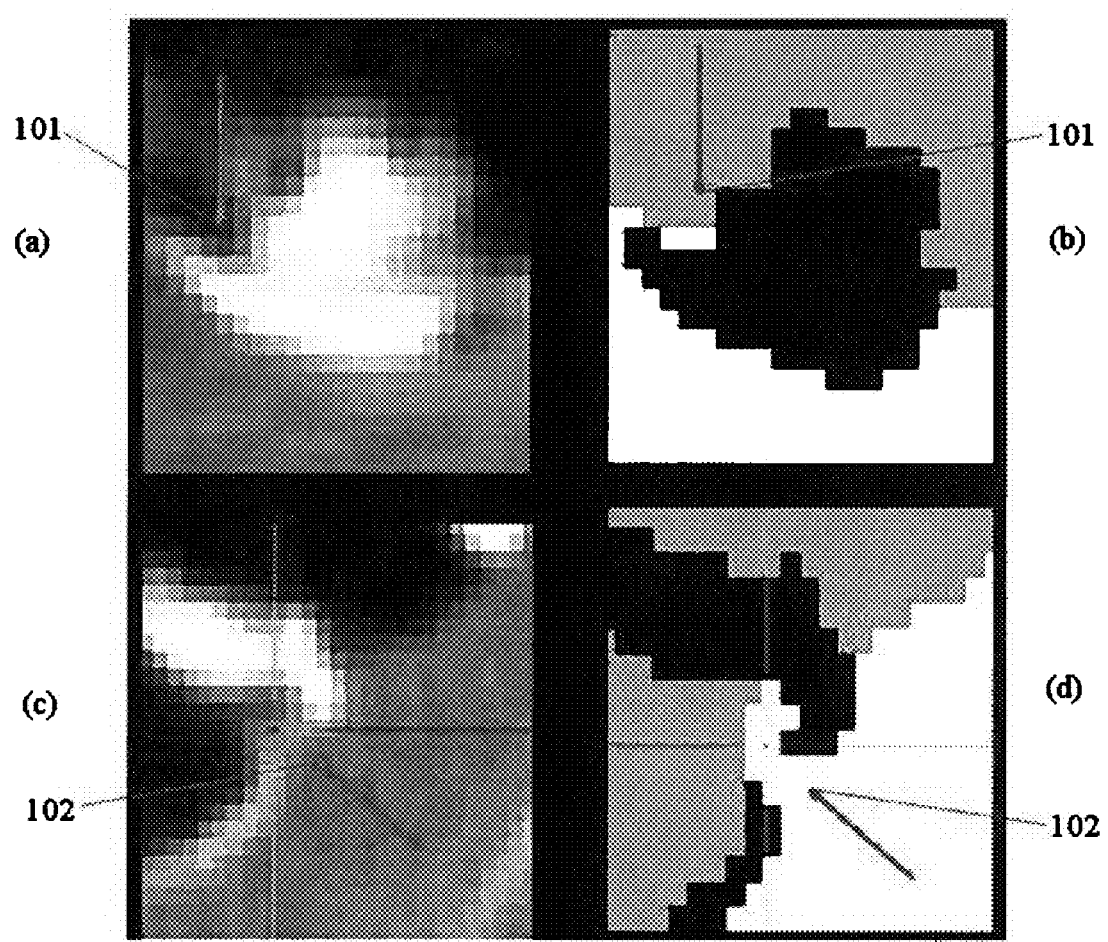
FIGS. 10(a)-(d) illustrate a real tissue voxel appearing to be partial volume between air and tag, according to an embodiment of the invention.

An algorithm according to an embodiment of the invention can incorporate 3D information to analyze voxel type and voxel weighted intensity. Consider an area that looks like fake tissue due to partial volume can actually be real tissue being enhanced. FIGS. 10(a)-(d) illustrate how 3D can capture more accurate information then 2D. FIGS. 10(b) and 10(d) suggest that the voxels 101, 102 at the arrow appears to be partial volume between air and tag, but are in fact real tissue, as shown at another viewpoint, FIGS. 10(a) and 10(c), which clearly show that the voxels 101, 102 are within the soft tissue region. A 3D algorithm according to an embodiment of the invention can combine all the features available in 3D to aid the classification. In addition, some voxels near the tag are actually enhanced but fall below the foreground threshold and cannot be visually identified by expert eyes, but the 3D sphere captures the information by assigning fraction of blending in the respective slides.

Figure 11:
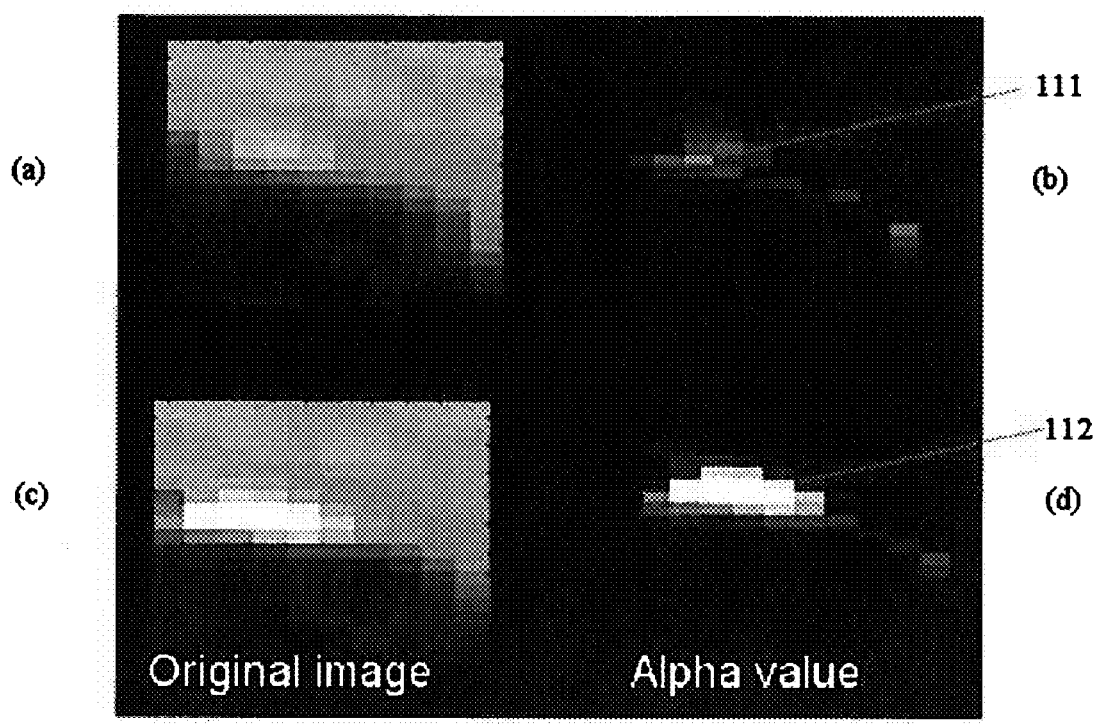
FIGS. 11(a)-(d) show the effect of a visible tag below the threshold intensity, according to an embodiment of the invention.

FIG. 11 shows 2 adjacent slices. The top-left, FIG. 11(a), is one slice and the bottom-left, FIG. 11(c) is the second slice. The top-right, FIG. 11(b), is the alpha value 111 detected in FIG. 11(a), and the bottom-right. FIG. 11(d), is the alpha value 112 detected in FIG. 11(c). In the first slice, the visible tag is below the threshold intensity so it is not detected. But with an algorithm according to an embodiment of the invention, the 3D sphere can pick the low intensity tag and assign alpha values. Looking at the next slice, the alpha value is picked up correctly because there is a high intensity tag in this slice. Without the 3D sphere, the tag appearing in the first slice will be missed.

More Results

Figure 12:
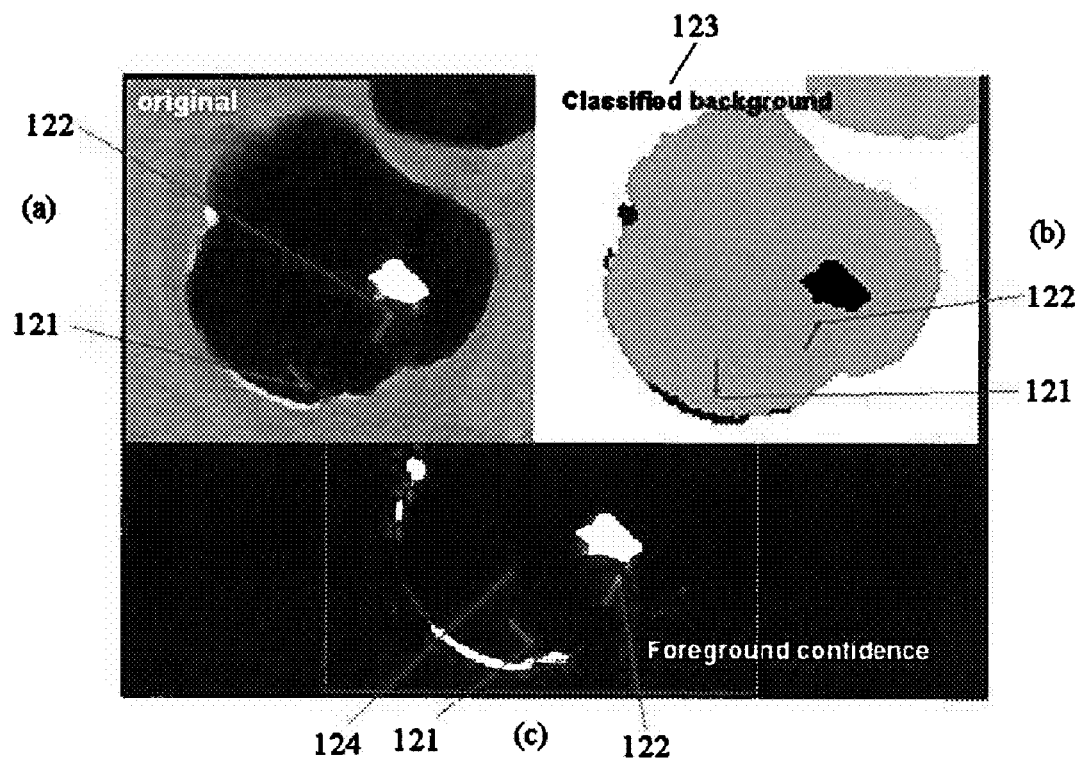
FIGS. 12(a)-(c) show a case where there is a hole between the tag and the tissue, according to an embodiment of the invention.

FIGS. 12(a)-(c) shows a case where there is a hole between the tag and the tissue. FIG. 12(a) is the original image, FIG. 12(b) shows region 123 classified as background, and FIG. 12(c) shows the extracted foreground 124. The hole is the object 121 pointed to by the lower arrow. The voxels in the hole are classified as air instead of tissue. It has a stand-alone tag which should be on the tip of a fold. The second arrow 122 points to the stand alone tag. An algorithm according to an embodiment of the invention successfully removes the partial volume around it and extracts the correct foreground. The classification would be incorrect would be if the hole was marked as tissue (white color in FIG. 12(b)).

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 13:
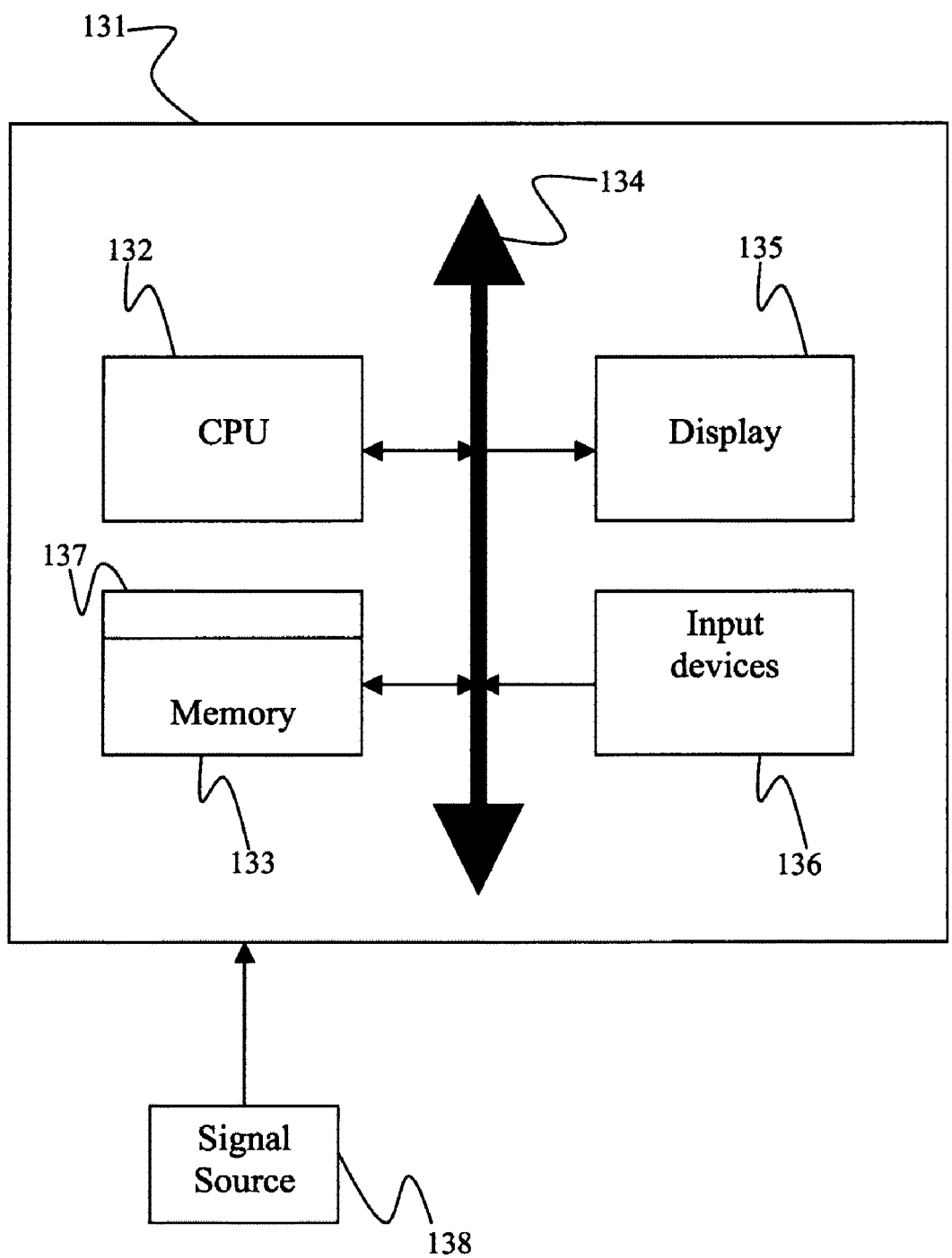
FIG. 13 is a block diagram of an exemplary computer system for implementing a method for detecting tagged material using alpha matting in computed tomographic colonography, according to an embodiment of the invention.

FIG. 13 is a block diagram of an exemplary computer system for implementing a method for detecting tagged material using alpha matting in computed tomographic colonography, according to an embodiment of the invention. Referring now to FIG. 13, a computer system 131 for implementing the present invention can comprise, inter calia, a central processing unit (CPU) 132, a memory 133 and an input/output (I/O) interface 134. The computer system 131 is generally coupled through the I/O interface 134 to a display 135 and various input devices 136 such as a mouse and a keyboard. The support circuits can include circuits such as cache, power supplies, clock circuits, and a communication bus. The memory 133 can include random access memory (RAM), read only memory (ROM), disk drive, tape drive, etc., or a combinations thereof. The present invention can be implemented as a routine 137 that is stored in memory 133 and executed by the CPU 132 to process the signal from the signal source 138. As such, the computer system 131 is a general purpose computer system that becomes a specific purpose computer system when executing the routine 137 of the present invention.

The computer system 131 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for computer-aided object classification, soft segmentation and layer extraction in computed tomographic colonography, said method comprising the steps of:
   providing a contrast enhanced computed tomography (CT) digital image of the colon, said image comprising a plurality of intensities associated with a 3-dimensional (3D) grid of voxels;
   finding a foreground region of voxels with an intensity higher than a pre-defined foreground threshold;
   creating a 3D trimap of said colon wherein said image is segmented into said foreground region, a background region, and an unknown region between the foreground and background;
   starting from said background, extracting successive layers of said unknown region until said foreground region is reached, and classifying each extracted layer as background or foreground; and
   generating a foreground matte, a background matte, and an alpha matte, wherein alpha indicates a mixing ration of foreground and background voxels.

2. The method of claim 1, wherein said background region voxels represent either regions of air in said colon, or regions of known soft tissue in said colon.

3. The method of claim 2, wherein creating a 3D trimap of said colon comprises morphologically dilating the 3D foreground region one voxel at a time until background region voxels are reached, wherein a region through which said foreground was diluted is a region of unknown type, and categorizing said background region voxels as either air or soft tissue.

4. The method of claim 1, wherein classifying each extracted layer as background or foreground comprises forming a 3D sphere around a candidate layer voxel and neighboring known background voxels, and analyzing closest known background voxels to determine whether said candidate layer voxel is a background air voxel or a background soft tissue voxel.

5. The method of claim 4, further comprising calculating said mixing ratio alpha for each voxel in said unknown region from alpha=(C−B)/(F−B), wherein C is the intensity of said voxel, B is a background intensity, and F is a foreground intensity.

6. The method of claim 5, wherein analyzing closest known background voxels comprises finding values of F and B that maximize a sum of log-likelihoods $L(C|B, F, \alpha)+L(F)+L(B)+L(\alpha)$, wherein $$L(C|F, B, \alpha) = -\frac{\|C - \alpha F - (1-\alpha)B\|^2}{2\sigma_C^2},$$

$$L(F) = -\frac{\|F - \overline{F}\|^2}{2\sigma_F^2}, \text{ and}$$

$$L(B) = -\frac{\|B - \overline{B}\|^2}{2\sigma_B^2},$$

wherein $\sigma_C^r$, $\sigma_F^2$, $\sigma_B^2$ are respective standard deviations for C, F, and B.

7. The method of claim 1, wherein generating a foreground matte, a background matte, and an alpha matte, comprises:
   forming a 3D sphere about each candidate voxel in said region of unknown type:
   obtaining from the background region within the sphere a number of air voxels, a number of tissue voxels, their respective distance from the candidate voxel, and their variance;
   obtaining from the foreground region within the sphere a number of tagged voxels having an intensity above a threshold for contrast enhancement, their respective distance from the candidate, and their variance;
   weighting the intensity of each tissue voxel by its distance from said candidate voxel;
   weighting the intensity of each air voxel by its distance from said candidate voxel;
   weighting the intensity of each foreground voxel by its distance from said candidate voxel; and
   calculating alpha from
   $C=\alpha F+\int_{\Omega(air)} H_{air}(1-\alpha(i))B_{air}(i)+\int_{\Omega(tissue)} H_{tissue}(1-\alpha(i))B_{tissue}(i)$, wherein C is the intensity of said candidate voxel, $B_{air}$ is a background air intensity, $B_{tissue}$ is a background tissue intensity, F is a foreground intensity, $\Omega$ is a region of integration in either air voxels or tissue voxels, i represents a voxel in the region of integration, and H is the Heaviside function having a value of 1 inside the region of integration.

8. The method of claim 7, wherein a foreground weighting function is:

$$F_{candidate} = \exp(-\beta_1 \sum d_i)\exp(-\beta_2/N)\frac{\sum F_i/d_i}{\sum 1/d_i},$$

wherein $F_{candidate}$ is the foreground weighted intensity at the candidate voxel, $F_i$ is the intensity value of the image at voxel i within the 3D sphere, $d_i$ is the distance to the candidate voxel, $\beta_1$ and $\beta_2$ are pre-defined parameters;

a background weighting function is $$B_{candidate} = \exp(-\beta_1 \sum d_i)\exp(-\beta_2/N)\frac{\sum B_i/d_i}{\sum 1/d_i},$$

wherein $B_{candidate}$ is the background weighted intensity at the voxel location and $B_i$ indicates the intensity value of the known background within said 3D sphere.

9. The method of claim 7, wherein a candidate voxel is identified as a T-junction where the number of tissue voxels, air voxels, and a number of tagged voxels are greater than zero inside a sphere of a predetermined small radius.

10. The method of claim 7, wherein for tagged voxels laying on a haustral fold, the method further comprises:
dilating said tagged voxels by a number of voxels less than an original size of said morphological dilation;
removing the tagged voxels and dilated voxels from a voxel window whose side is greater than the original size of said morphological dilation;
performing region growing to find connected voxels;
identifying the connected voxels; and
performing matting, wherein there is no type change of any voxel that has been identified as a connected voxel.

11. A method for computer-aided object classification, soft segmentation and layer extraction in computed tomographic colonography, said method comprising the steps of:
providing a contrast enhanced computed tomography (CT) digital image of the colon, said image comprising a plurality of intensities associated with a 3-dimensional (3D) grid of voxels;
creating a 3D trimap of said colon wherein said image is segmented into a foreground region, a background region, and an unknown region between the foreground and background;
forming a 3D sphere about a candidate voxel in said region of unknown type;
obtaining from the background region within the sphere a number of air voxels, a number of tissue voxels, their respective distance from the candidate voxel, and their variance;
obtaining from the foreground region within the sphere a number of tagged voxels having an intensity above a threshold for contrast enhancement, their respective distance from the candidate, and their variance;
weighting the intensity of each tissue voxel by its distance from said candidate voxel;
weighting the intensity of each air voxel by its distance from said candidate voxel;
weighting the intensity of each foreground voxel by its distance from said candidate voxel; and
calculating a mixing ratio of foreground and background voxels a from
$C=\alpha F+\int_{\Omega(air)}H_{air}(1-\alpha(i))B_{air}(i)+\int_{\Omega(tissue)}H_{tissue}(1-\alpha(i))B_{tissue}(i)$, wherein C is the intensity of said candidate voxel, $B_{air}$ is a background air intensity, $B_{tissue}$ is a background tissue intensity, F is a foreground intensity, $\Omega$ is a region of integration in either air voxels or tissue voxels, i represents a voxel in the region of integration, and H is the Heaviside function having a value of 1 inside the region of integration.

12. The method of claim 11, wherein said foreground region comprises voxels with an intensity higher than a pre-defined foreground threshold for contrast enhanced voxels.

13. The method of claim 11, further comprising, starting from said background, extracting successive layers of said unknown region until said foreground region is reached, and classifying each extracted layer as background or foreground.

14. The computer readable program storage device of claim 13, wherein said background region voxels represent either regions of air in said colon, or regions of known soft tissue in said colon.

15. The computer readable program storage device of claim 14, wherein creating a 3D trimap of said colon comprises morphologically dilating the 3D foreground region one voxel at a time until background region voxels are reached, wherein a region through which said foreground was diluted is a region of unknown type, and categorizing said background region voxels as either air or soft tissue.

16. A program storage device readable by a computer, tangibly embodying a program of instructions executable by the computer to perform the method steps for computer-aided object classification, soft segmentation and layer extraction in computed tomographic colonography, said method comprising the steps of:
providing a contrast enhanced computed tomography ((CT) digital image of the colon, said image comprising a plurality of intensities associated with a 3-dimensional (3D) grid of voxels;
finding a foreground region of voxels with an intensity higher than a pre-defined foreground threshold;
creating a 3D trimap of said colon wherein said image is segmented into said foreground region, a background region, and an unknown region between the foreground and background;
starting from said background, extracting successive layers of said unknown region until said foreground region is reached, and classifying each extracted layer as background or foreground; and
generating a foreground matte, a background matte, and an alpha matte, wherein alpha indicates a mixing ration of foreground and background voxels.

17. The computer readable program storage device of claim 16, wherein classifying each extracted layer as background or foreground comprises forming a 3D sphere around a candidate layer voxel and neighboring known background voxels, and analyzing closest known background voxels to determine whether said candidate layer voxel is a background air voxel or a background soft tissue voxel.

18. The computer readable program storage device of claim 17, the method further comprising calculating said mixing ratio alpha for each voxel in said unknown region from alpha=(C−B)/(F−B) wherein C is the intensity of said voxel, B is a background intensity, and F is a foreground intensity.

19. The computer readable program storage device of claim 18, wherein analyzing closest known background voxels comprises finding values of F and B that maximize a sum of log-likelihoods L(C|B, F, α)+L(F)+L(B)+L(α), wherein $$L(C\mid F, B, \alpha) = -\frac{\|C - \alpha F - (1-\alpha)B\|^2}{2\sigma_C^2},$$

$$L(F) = \frac{\|F - \overline{F}\|^2}{2\sigma_F^2}, \text{ and}$$

$$L(B) = -\frac{\|B - \overline{B}\|^2}{2\sigma_B^2},$$

wherein $\sigma_C^F$, $\sigma_F^2$, $\sigma_B^2$ are respective standard deviations for C, F, and B.

20. The computer readable program storage device of claim 14, wherein generating a foreground matte, a background matte, and an alpha matte, comprises:
   forming a 3D sphere about each candidate voxel in said region of unknown type;
   obtaining from the background region within the sphere a number of air voxels, a number of tissue voxels, their respective distance from the candidate voxel, and their variance;
   obtaining from the foreground region within the sphere a number of tagged voxels having an intensity above a threshold for contrast enhancement, their respective distance from the candidate, and their variance;
   weighting the intensity of each tissue voxel by its distance from said candidate voxel;
   weighting the intensity of each air voxel by its distance from said candidate voxel;
   weighting the intensity of each foreground voxel by its distance from said candidate voxel; and
   calculating alpha from
   C=αF+∫$_{\Omega(air)}$H$_{air}$(1-α(i)) B$_{air}$(i)+∫$_{\Omega(tissue)}$H$_{tissue}$(1-α(i))B$_{tissue}$(i), wherein C is the intensity of said candidate voxel, B$_{air}$ is a background air intensity, B$_{tissue}$ is a background tissue intensity F is a foreground intensity, Ω is a region of integration in either air voxels or tissue voxels, i represents a voxel in the region of integration, and H is the Heaviside function having a value of 1 inside the region of integration.

21. The computer readable program storage device of claim 20, wherein a foreground weighting function is:

$$F_{candidate} = \exp\left(-\beta_1 \sum d_i\right)\exp(-\beta_2/N)\frac{\sum F_i/d_i}{\sum 1/d_i},$$

wherein F$_{candidate}$ is the foreground weighted intensity at the candidate voxel, F$_i$ is the intensity value of the image at voxel i within the 3D sphere, d$_i$ is the distance to the candidate voxel, β$_1$ and β$_2$ are pre-defined parameters,
a background weighting function is $$B_{candidate} = \exp\left(-\beta_1 \sum d_i\right)\exp(-\beta_2/N)\frac{\sum B_i/d_i}{\sum 1/d_i},$$

wherein B$_{candidate}$ is the background weighted intensity at the voxel location and B$_i$ indicates the intensity value of the known background within said 3D sphere.

22. The computer readable program storage device of claim 20, wherein a candidate voxel is identified as a T-junction where the number of tissue voxels, air voxels, and a number of tagged voxels are greater than zero inside a sphere of a predetermined small radius.

23. The computer readable program storage device of claim 20, wherein for tagged voxels laying on a haustral fold, the method further comprises:
   dilating said tagged voxels by a number of voxels less than an original size of said morphological dilation;
   removing the tagged voxels and dilated voxels from a voxel window whose side is greater than the original size of said morphological dilation;
   performing region growing to find connected voxels;
   identifying the connected voxels; and
   performing matting, wherein there is no type change of any voxel that has been identified as a connected voxel.

* * * * *